(12) United States Patent
Shin

(10) Patent No.: US 11,165,903 B1
(45) Date of Patent: Nov. 2, 2021

(54) APPARATUS FOR TRANSMITTING MESSAGE AND METHOD THEREOF

(71) Applicant: Ko Eun Shin, Seoul (KR)

(72) Inventor: Ko Eun Shin, Seoul (KR)

(*) Notice: Subject to any disclaimer, the term of this patent is extended or adjusted under 35 U.S.C. 154(b) by 0 days.

(21) Appl. No.: 17/231,624

(22) Filed: Apr. 15, 2021

(30) Foreign Application Priority Data

Nov. 4, 2020 (KR) .................. 10-2020-0146333

(51) Int. Cl.
*H04M 1/72436* (2021.01)
*G06F 3/0484* (2013.01)
*G06F 3/0482* (2013.01)
*G06F 3/0488* (2013.01)
*G06F 3/041* (2006.01)
*G06F 3/01* (2006.01)
*G06F 3/0489* (2013.01)

(52) U.S. Cl.
CPC ........ *H04M 1/72436* (2021.01); *G06F 3/013* (2013.01); *G06F 3/0416* (2013.01); *G06F 3/0482* (2013.01); *G06F 3/0484* (2013.01); *G06F 3/04883* (2013.01); *G06F 3/04895* (2013.01); *H04M 2201/42* (2013.01)

(58) Field of Classification Search
CPC . G06F 3/048; H04M 1/7243; H04M 1/72439; H04M 1/72469
See application file for complete search history.

(56) References Cited

U.S. PATENT DOCUMENTS

| | | | |
|---|---|---|---|
| 2006/0044265 A1* | 3/2006 | Min | G02B 27/017 345/156 |
| 2010/0211904 A1* | 8/2010 | Yun | G06F 3/0481 715/773 |
| 2014/0282203 A1* | 9/2014 | Pasquero | G06F 3/04886 715/773 |
| 2019/0227688 A1* | 7/2019 | Wang | G06F 3/041 |
| 2020/0133478 A1* | 4/2020 | Chaudhri | G06F 3/04883 |
| 2021/0096736 A9* | 4/2021 | Chaudhri | H04N 5/232933 |
| 2021/0152684 A1* | 5/2021 | Weinstein | G06F 3/167 |

FOREIGN PATENT DOCUMENTS

| | | |
|---|---|---|
| KR | 10-2007-0099251 A | 10/2007 |
| KR | 10-2011-0035376 A | 4/2011 |
| KR | 10-2012-0002252 A | 1/2012 |
| KR | 10-2014-0117914 A | 10/2014 |
| KR | 10-2018-0042580 A | 4/2018 |

OTHER PUBLICATIONS

Korean Decision to Grant Patent for KR 10-2020-0146333 dated Feb. 19, 2021.
Office Action issued from Korean Patent Application No. 10-2020-0146333 dated Jan. 31, 2021.

* cited by examiner

*Primary Examiner* — Gerald Johnson
(74) *Attorney, Agent, or Firm* — Sughrue Mion, PLLC

(57) ABSTRACT

Disclosed are an apparatus for transmitting a message and a method thereof that perform a preset message transmission function or a preset line break function by selecting a character key on a message input screen displayed on the apparatus for transmitting a message and then pressing another character key displayed in a preset color around the selected character key for a preset time or longer so that the efficiency of keyboard input is enhanced and the convenience of a user inputting text is improved.

10 Claims, 5 Drawing Sheets

APPARATUS FOR TRANSMITTING MESSAGE AND METHOD THEREOF

CROSS-REFERENCE TO RELATED APPLICATION

This application claims priority to and the benefit of Korean Patent Application No. 10-2020-0146333, filed on Nov. 4, 2020, the disclosure of which is incorporated herein by reference in its entirety.

BACKGROUND

1. Field of the Invention

The present invention relates to an apparatus for transmitting a message and a method thereof, and more specifically, to an apparatus for transmitting a message, which is capable of performing a preset message transmission function or a preset line break function by selecting a character key in a message input screen displayed on the apparatus for transmitting a message and then pressing another character key displayed in a preset color around the selected character key for a preset time or longer, and a method thereof.

2. Discussion of Related Art

A smart phone is an intelligent terminal obtained by adding various computer supported functions to a mobile terminal and is characterized in installing application programs desired by a user.

When entering text using such a smartphone, since a keypad including a plurality of character keys is displayed in a fixed state on the smartphone, typing with one or two hands is inconvenient due to a transmission button being fixed at a specific position.

RELATED ART DOCUMENT

Patent Document

Korean Laid-open Utility model No. 20-2017-0000990 [Title: A method of preventing accidental transmission of text messages]

SUMMARY OF THE INVENTION

The present invention is directed to providing an apparatus for transmitting a message, which is capable of performing a preset message transmission function or a preset line break function by selecting a character key in a message input screen displayed on the apparatus for transmitting a message and then pressing another character key indicated in a preset color around the selected character key for a preset time or longer, and a method thereof.

The present invention is directed to providing an apparatus for transmitting a message, which is capable of performing a preset message transmission function or a preset line break function by selecting a character key in a message input screen displayed on the apparatus for transmitting a message and then detecting a preset touch gesture of a user on a transmission/reception message display region in the message input screen or detecting a preset motion of the apparatus for transmitting a message, and a method thereof.

The technical objectives of the present invention are not limited to the above, and other objectives may become apparent to those of ordinary skill in the art based on the following descriptions.

According to an aspect of the present invention, there is provided an apparatus for transmitting a message, the apparatus including a display configured to display a message list screen, and a controller configured to: when a preset new message menu is selected in the message list screen displayed on the display, control the display to display a message input screen corresponding to the selected new message menu; when one or more character keys are sequentially selected according to selection of a user among a plurality of character keys displayed on a virtual key pad region in the message input screen while an input message display region in the message input screen displayed on the display is activated, sequentially display the sequentially selected one or more character keys on the input message display region in the message input screen of the display; when the one character key is selected according to the selection of the user among the plurality of character keys displayed on the virtual key pad region, indicate one or more other character keys or function keys adjacent to the selected one character key in a preset different color or pattern; and after the character key is selected according to the selection of the user, when a specific other character key or a specific other function key among the one or more other character keys and function keys indicated in the preset different color adjacent to the one character key that is kept in a touch and hold state for a preset time or longer, perform a preset function.

The message input screen may include at least one of: a recipient input region for receiving a phone number or an e-mail address related to a specific recipient who receives a message; a transmission/reception message display region for displaying a content of a message exchanged with the specific recipient; a file attachment region for selecting a file previously stored in the apparatus including the display and attaching the file to the message; a camera selection region for acquiring, in real time, image information of an image or a video using a camera provided in the apparatus; an additional menu display region for applying an additional function when transmitting the message; the input message display region for displaying a message content according to an input of the user; and a virtual keypad region including a plurality of virtual keys.

The preset function may include one of a line break function and a text message transmission function.

The text message transmission function may be a function configured to, while recipient information of a recipient who receives a message is input on a recipient input region in the message input screen, transmit a message that is input in the input message display region until the specific other character key or the specific other function key is kept in the touch and hold state for the preset time or longer to a terminal corresponding to the recipient information in connection with a text message transmission server.

According to another aspect of the present invention, there is provided an apparatus for transmitting a message, the apparatus including: a display configured to, when a preset new message menu is selected in a message list screen, display a message input screen corresponding to the selected new message menu; and a controller configured to, when one or more character keys are sequentially selected according to selection of a user among a plurality of character keys displayed on a virtual key pad region in the message input screen while an input message display region in the message input screen displayed on the display is activated, sequentially display the sequentially selected one or more character keys on the input message display region in the message input screen of the display, and when a preset event occurs after the selecting of the character key according to the selection of the user, perform a preset function.

According to another aspect of the present invention, there is provided a method of transmitting a message, the method including: displaying, by a display, a message list screen; when a preset new message menu is selected in the message list screen displayed on the display, displaying, by a controller, a message input screen corresponding to the selected new message menu; when one or more character keys are sequentially selected according to selection of a user among a plurality of character keys displayed on a virtual key pad region in the message input screen while an input message display region in the message input screen displayed on the display is activated, sequentially displaying, by the controller, the sequentially selected one or more character keys on the input message display region in the message input screen; when the one character key is selected according to the selection of the user among the plurality of character keys displayed on the virtual key pad region, indicating, by the controller, one or more other character keys or function keys adjacent to the selected one character key in a preset different color or pattern; and after the character key is selected according to the selection of the user, when a specific other character key or a specific other function key among the one or more other character keys and function keys indicated in the preset different color adjacent to the one character key is being kept in a touch and hold state for a preset time or longer, performing, by the controller, a preset function.

The indicating of the one or more other character keys or function keys adjacent to the selected one character key in the preset different color or pattern may include, when a character key is selected according to the selection of the user among the plurality of character keys, indicating at least one of one or more other character keys and function keys around the selected character key in a color or pattern different from a preset background default color or background default pattern set for the plurality of character keys displayed on the virtual key pad region.

The method may further include, after the character key is selected according to the selection of the user, when a specific other character key or a specific other function key among the one or more other character keys and function keys indicated in the preset different color around the character key is being kept in touch for less than the preset time, performing, by the controller, a function corresponding to the specific other character key or the specific other function key that is touched.

According to another aspect of the present invention, there is provided a method of transmitting a message, the method including: when a preset new message menu is selected in a message list screen displayed on a display, displaying, by a controller, a message input screen corresponding to the selected new message menu; when one or more character keys are sequentially selected according to selection of a user among a plurality of character keys displayed on a virtual key pad region in the message input screen while an input message display region in the message input screen displayed on the display is activated, sequentially displaying, by the controller, the sequentially selected one or more character keys on the input message display region in the message input screen; and when a preset event occurs after the selecting of the character key according to the user selection, performing, by the controller, a preset function.

The preset event may include at least one of: a preset touch gesture of the user being detected in a transmission/reception message display region in the message input screen; a preset motion of an apparatus for transmitting a message being detected through a sensor; a specific character key or a specific function key selected last that is kept in a touch and hold state for a preset time or longer; and a gaze of the user being kept on a specific region in the message input screen for another preset time or longer.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
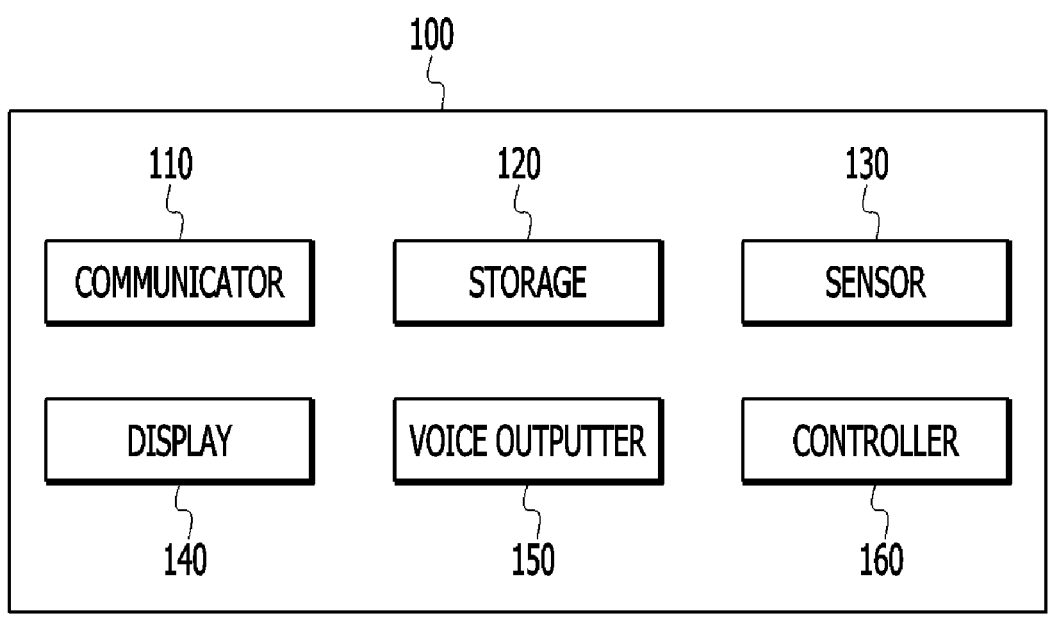
FIG. 1 is a block diagram illustrating a configuration of an apparatus for transmitting a message according to an embodiment of the present invention.

It should be noted that the technical terms used herein are used only to describe specific embodiments and are not intended to be limiting to the present invention. In addition, unless otherwise defined, technical terms used herein should be interpreted in a sense generally understood by one of ordinary skill in the art to which this invention belongs and should not be construed to mean or be interpreted in an excessively inclusive sense or an excessively reduced sense. In addition, when a technical term used herein is an erroneous technical term that does not accurately express the concept of the present invention, it should be understood that it is replaced with a technical term that can be understood by a person skilled in the art. In addition, the general terms used herein should be interpreted in accordance with the predefined or prior context and should not be construed as being excessively reduced.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components but do not preclude the presence or addition of one or more other features, integers, steps, operations, elements, components, and/or groups thereof.

It will be understood that, although the terms first, second, A, B, etc. may be used herein to describe various elements, the elements should not be limited to the terms. The terms are only used to distinguish one element from another. For example, a first element could be termed a second element, and, similarly, a second element could be termed a first element without departing from the scope of the present invention.

Hereinafter, exemplary embodiments of the present invention will be described in detail with reference to the accompanying drawings, wherein like reference numerals refer to like or similar elements, and redundant description thereof will be omitted.

In the description of the embodiments, the detailed description of related known functions or constructions will be omitted herein to avoid making the subject matter of the present disclosure unclear. In addition, the accompanying drawings are used to aid in the explanation and understanding of the present invention and are not intended to limit the scope and spirit of the present invention.

FIG. 1 is a block diagram illustrating a configuration of an apparatus 100 for transmitting a message according to an embodiment of the present invention.

Referring to FIG. 1, the apparatus 100 for transmitting messages includes a communicator 110, a storage 120, a sensor 130, a display 140, a voice outputter 150, and a controller 160. However, all of the components shown in FIG. 1 are not essential components of the apparatus 100 for transmitting messages, and the apparatus 100 for transmitting messages may be implemented by a larger number of components than the components illustrated in FIG. 1 or may be implemented by a smaller number of components than the components illustrated in FIG. 1.

The apparatus 100 for transmitting messages may be applied to various terminals, such as a smart phone, a portable terminal, a mobile terminal, a foldable terminal, a personal digital assistant (PDA), a portable multimedia player (PMP) terminal, a telematics terminal, a navigation terminal, a personal computer (PC), a notebook computer, a slate PC, a tablet PC, an ultrabook computer, a wearable device (e.g., a smartwatch, smart Glasses, a Head Mounted Display (HMD), etc.), a wireless broadband (WiBro) terminal, an Internet protocol television (IPTV) terminal, a smart TV, a digital broadcasting terminal, an audio video navigation (AVN) terminal, an audio/video (AN) system, a flexible terminal, a digital signage device, and the like.

The communicator 110 is communicatively connected to internal components or at least one external terminal through a wired/wireless communication network. In this case, the external terminal may include a text message transmission server (not shown), a server (not shown), another terminal (not shown), and the like. Here, wireless Internet technologies include wireless local area network (WLAN), digital living network alliance (DLNA), Wireless Broadband (Wi-Bro), World Interoperability for Microwave Access (WiMAX), high speed downlink packet access (HSDPA), high speed uplink packet access (HSUPA), IEEE 802.16, long term evolution (LTE), long term evolution-advanced (LTE-A), wireless mobile broadband service (WMBS), and the like. In addition, the communicator 110 transmits and receives data according to at least one wireless Internet technology in a range including Internet technologies not listed above. In addition, short-range communication technologies include Bluetooth, radio frequency identification (RFID), infrared data association (IrDA), ultra-wideband (UWB), ZigBee, near field communication (NFC), ultra sound communication (USC), visible light communication (VLC), Wi-Fi, Wi-Fi Direct, and the like. In addition, wired communication technologies may include power line communication (PLC), universal serial bus (USB) communication, Ethernet, serial communication, optical/coaxial cables, and the like.

In addition, the communicator 110 may transmit and receive information to and from an arbitrary terminal through a USB.

In addition, the communicator 110 transmits and receives wireless signals to and from a base station, the text message transmission server, the server, the other terminal, and the like over a mobile communication network constructed according to technical standards or communication methods for mobile communication, for example, global system for mobile communication (GSM), code division multi access (CDMA), code division multi access 2000 (CDMA2000), enhanced voice-data optimized or enhanced voice-data only (EV-DO), Wideband CDMA (WCDMA), HSDPA, HSUPA, LTE, LTE-A, etc.

In addition, the communicator 110 performs a text message transmission/reception function with the other terminal through the text message transmission server under the control of the controller 160.

The storage 120 stores various user interfaces (UIs), graphic user interfaces (GUIs), and the like.

In addition, the storage 120 stores data and programs required for operations of the apparatus 100 for transmitting messages.

That is, the storage 120 may store a plurality of application programs (or applications) driven by the apparatus 100 for transmitting messages, and data and instructions for operation of the apparatus 100 for transmitting messages. At least some of the application programs may be downloaded from an external server through wireless communication. In addition, at least some of the application programs may exist on the apparatus 100 for transmitting messages from a time of shipment for basic functions of the apparatus 100 for transmitting messages. On the other hand, the application programs may be stored in the storage 120 and installed in the apparatus 100 for transmitting messages so as to be driven by the controller 160 to perform operations (or functions) of the apparatus 100 for transmitting messages.

In addition, the storage 120 may include at least one type of storage medium from among a flash memory type memory, a hard disk type memory, a multimedia card micro type memory, a card type memory (for example, Secure Digital (SD), eXtreme Digital (XD) memory, etc.), a magnetic memory, a magnetic disk, an optical disk, a random access memory (RAM), a static RAM (SRAM), a read-only memory (ROM), an electrically erasable programmable ROM (EEPROM), a programmable ROM (PROM), and the like. In addition, the apparatus 100 for transmitting messages may operate a web storage that performs a storage function of the storage 120 over the Internet or may operate in association with the web storage.

In addition, the storage 120 stores contents of a message transmitted to and received from the other terminal under the control of the controller 160.

The sensor 130 includes a motion recognition sensor that is provided at a predetermined position of the apparatus 100 for transmitting messages 100 and detects a motion of the apparatus 100 for transmitting messages. Here, the motion recognition sensor may include a sensor that recognizes a motion or position of an object, a geomagnetism sensor, an acceleration sensor, a gyro sensor, an inertial sensor, an altimeter, and a vibration sensor and may additionally include sensors related to motion recognition.

In addition, the sensor 130 detects information about a motion of the apparatus 100 for transmitting messages, for example, information related to an inclined direction, an inclined angle and/or inclined speed, vibration directions, such as up/down/left/right/diagonal directions, and/or the number of vibrations. Here, the detected information (inclined direction, inclined angle and/or inclined speed, vibration directions and/or the number of vibrations) is digitized through a digital signal processing process, and the digitized information is transmitted to the controller 160.

The display (or a display) 140 may display various contents, such as various menu screens, using a UI and/or GUI stored in the storage 120 under the control of the controller 160. Here, the content displayed on the display 140 includes various texts or image data (including various types of information data) and a menu screen including icons, list menus, combo boxes, and other pieces of data. In addition, the display 140 may be a touch screen.

In addition, the display 140 includes at least one of a liquid crystal display (LCD), a thin film transistor liquid crystal display (TFT LCD), an organic light-emitting diode (OLED) display, a flexible display, a three-dimensional (3D) display, an electronic ink (e-ink) display, and a light-emitting diode (LED) display.

In addition, the display 140 displays a message list screen (or an application execution result screen) according to execution of a message application under the control of the controller 160.

The voice outputter 150 outputs voice information included in a signal that results from predetermined signal processing by the controller 160. Here, the voice outputter 150 may include a receiver, a speaker, a buzzer, and the like.

In addition, the voice outputter 150 outputs a guide voice generated by the controller 160.

In addition, the voice outputter 150 outputs voice information (or sound information) related to the message list screen (or the application execution result screen) displayed on the display 140 under the control of the controller 160.

The controller (or a micro control unit (MCU)) 160 executes the overall control function of the apparatus 100 for transmitting messages.

In addition, the controller 160 executes the overall control function of the apparatus 100 for transmitting messages using the programs and data stored in the storage 120. The controller 160 may include a RAM, a ROM, a central processing unit (CPU), a graphics processing unit (GPU), and a bus, and the RAM, the ROM, the CPU, the GPU, and the like may be connected to each other through the bus. The CPU may access the storage 120 to perform booting using an operating system (OS) stored in the storage 120 and may perform various operations using various programs, contents, data, and the like stored in the storage 120.

In addition, the apparatus 100 for transmitting messages is configured to, in response to a message application for message transmission being selected according to selection of a user (or input/touch/control of a user) among a plurality of applications installed in the apparatus 100 for transmitting messages, execute the selected message application (or the selected message application program) and display a message list screen according to execution of the message application on the display 140. Here, the message list screen includes a search menu (or buttons/items) for searching for pre-stored message contents, a view-more menu for providing various functions related to messages, a full menu for displaying the contents of all messages transmitted/received, a new category menu for classifying transmitted/received messages according to various purposes (including business conversations, receipts, etc.), a new message menu for writing a new message content, and the like. In addition, the view-more menu includes a deletion item for deleting transmitted/received messages, a category editing item for editing information about categories, a group texting item for transmitting group texts to a plurality of terminals, an asterisk message item for adding an asterisk message to an important message, a setting item for setting various functions of the message application, and an inquiry item for delivering an inquiry to the text message transmission server (not shown) that provides the message application.

The message list screen according to the embodiment of the present invention is described as including the search menu, the view-more menu, the full menu, the new category menu, the new message menu, and the like but is not limited thereto, and the message list screen may be implemented in various types of UIs according to a manufacturer that manufactures the apparatus 100 for transmitting messages, and elements forming the message list screen may be configured in various forms to include a search menu, a full menu, a new message menu, and the like.

In addition, in response to the new message menu being selected in the message list screen displayed on the display 140 according to selection of a user (or input/touch/control of a user) of the apparatus 100 for transmitting messages, the controller 160 displays a message input screen for writing and transmitting a new message on the display 140. Here, the message input screen (or a message editing window) includes a recipient input region (or a menu/item) for inputting a phone number, an e-mail address, and the like related to a person (or a recipient) to receive a message, a transmission/reception message display region for displaying a content of a message exchanged (transmitted/received) with a specific recipient, a file attachment region for selecting a file previously stored in the apparatus 100 for transmitting messages and attaching the file to the message, a camera selection region for acquiring, in real time, image information of an image or a video using a camera provided in the apparatus 100 for transmitting messages, an additional menu display region for applying an additional function when transmitting the message, an input message display region for displaying contents of a message according to an input of the user, and a virtual keypad region including a plurality of virtual keys (or character keys/text keys). In addition, the additional menu display region includes a remittance item for remitting cash together with a message, a quick reply phrase item for selecting a preset reply phrase, a message reservation item for a reservation function for a message to be transmitted, a title item for setting a title of a message, an image transmission item for transmitting a pre-stored image together with a message, a video transmission item for transmitting a pre-stored video together with a message, an audio transmission item for transmitting a pre-stored audio together with a message, a contact transmission item for transmitting a contact stored in a phone book together with a message, a location transmission item for transmitting location information of the apparatus 100 for transmitting messages identified in real time together with a message, a calendar transmission item for transmitting pre-stored schedule information with a message, a memo transmission item for transmitting pre-stored contents of memo with a message, a voice recording item for transmitting voice information recorded in real time together with a message, and the like. In addition, the virtual keypad region includes various types of character keys (or character keys/virtual keys) and function keys (for example, a delete key, a line break key/enter key, a Korean/English conversion key, a number/special character conversion key, etc.) for Korean input, English input, and other language input. Here, various types of characters corresponding to the various types of character keys include Korean consonants, Korean vowels, English uppercase letters, English lowercase letters, numbers, and special characters (e.g., a comma, a period, a question mark, an exclamation mark, a symbol, up/down/left/right arrow keys), and the like. In addition, a display method (or a notation method) of Korean consonants and Korean vowels may use a Cheon-ji-in method, a Narat-gul method, a QWERTY method, a short vowel method, a Vega method, etc. In addition, a display method (or a notation method) of uppercase and lowercase letters of English may use a QWERTY method, a 3×4 method (for example, letters of an alphabet arranged in rows of three or four letters, such as ABC, DEF, GHI, JKL, MNO, PQRS, TUV, WXYZ, etc., on one keyboard), and the like.

The embodiment of the present invention is mainly described for Korean and English, but the present invention is not limited thereto, and the technical configurations of the present invention may be applied to other languages (e.g., French, Spanish, German, Chinese, etc.).

In response to one or more character keys that are sequentially selected according to selection of a user among a plurality of character keys displayed on the virtual key pad region in the message input screen while the input message display region in the message input screen displayed on the display 140 is activated (or a cursor is located in the input message display region), the controller 160 sequentially displays the sequentially selected one or more character keys on the input message display region in the message input screen of the display 140. Here, the controller 160 may be in a state in which a phone number, an email address, etc. of a recipient who receives the message has been input (received) in the recipient input region according to an input of the user.

In addition, in response to one character key being selected according to the selection of the user among the plurality of character keys displayed on the virtual key pad region, the controller 160 may indicate one or more other character keys and/or function keys located around (or adjacent to) the selected one character key in a preset different color (and/or different pattern).

In other words, in response to one character key among the plurality of character keys being selected according to a selection (a touch/input/control) of the user, the controller 160 may indicate one or more other character keys and/or function keys located around the selected one character key in a color (e.g., dark gray, light sky blue, light yellow, etc. and/or hatched pattern, horizontal line pattern, vertical line pattern, etc.) different from a preset background default color (e.g., light gray or no pattern/background default patterns) that is set for the plurality of character keys displayed on the virtual key pad region.

After the character key is selected according to the user selection, the controller 160, in response to a specific other character key (or a specific other function key) among the one or more other character keys and function keys indicated in the preset different color around the character key that is being kept in a touch and hold state for a preset time or longer, performs a preset function. Here, the preset function includes a line break function, a text message transmission function, and the like. In this case, the line break function may be a function of changing the position of a cursor located next to a corresponding character key to the next line and displaying the position of the cursor. In addition, the text message transmission function is a function configured to, while recipient information of a recipient who receives a message is input on the recipient input region, transmit a message having been input in the input message display region until the specific other character key (or the specific other function key) is kept in the touch and hold state for the preset time or longer to a terminal (not shown) corresponding to the recipient information through connection between the text message transmission server and the apparatus 100 for transmitting messages. Here, in response to the recipient information not being received at a time when the specific other character key (or the specific other function key) is kept in the touch and hold state for the preset time or longer, the controller 160 may display guide information for inputting recipient information according to an input of the user on the display 140 and, after receiving the recipient information according to the input of the user, may transmit the message to the terminal corresponding to the recipient information in connection with the text message transmission server.

In addition, after the character key is selected according to the user selection, the controller 160, in response to a specific other character key, among the one or more other character keys and function keys indicated in the preset different color around the character key, being touched (or selected) for less than the preset time, repeats displaying of another selected specific character key on the input message display region and indicating one or more other character keys located around the specific other character key in a preset color, or displays a function execution screen corresponding to the selected specific other function key (for example, a Korean/English conversion function execution result screen according to selection of a Korean/English conversion function key).

In other words, after the character key is selected according to the user selection, the controller 160, in response to a specific other character key, among the one or more other character keys and function keys indicated in the preset different color located around the character key, being touched (or selected) for less than the preset time, performs a text input function according to selection of a general character key, or performs a function corresponding to a function key according to selection of a general function key.

In addition, in response to occurrence of a preset event after the character key is selected according to the user selection, the controller 160 performs the preset function. The preset function includes a line break function, a text message transmission function, and the like. In addition, the preset event includes a preset touch gesture of a user being detected in the transmission/reception message display region in the message input screen, a preset motion of the apparatus 100 for transmitting messages being detected through the sensor 130, a specific character key (or a specific function key) selected last that is kept in a touch and hold state for a preset time or longer, and a gaze of a user being kept on a specific region (e.g., the transmission/reception message display region, and the like) in the message input screen for another preset time (e.g., three seconds) or longer. In addition, the motion of the apparatus 100 for transmitting messages includes vibration/motion in the up/down direction a preset number of times or more, vibration/motion in the left/right direction a preset number of times or more, vibration/motion in a diagonal direction a preset number of times or more, rotation/motion in clockwise/counterclockwise directions a preset number of times or more, a change in the inclined angle of the apparatus 100 for transmitting messages at a preset angle or greater within a preset time, and the like.

Here, the touch gesture of the user includes a tap, a double tap, a drag, panning, a flick, a pinch, a swipe, and the like.

The term "tap" refers to an operation in which a user touches a screen with a finger or a touch tool (e.g., an electronic pen) and then immediately lifts the finger or the touch tool from the screen without moving.

The term "touch & hold" refers to an operation in which a user touches a screen using a finger or a touch tool (e.g., an electronic pen) and maintains the touch input for a threshold time (e.g., two seconds) or longer. That is, the term "touch & hold" refers to a case where the time difference between a touch-in time point and a touch-out time point is greater than or equal to a threshold time (e.g., two seconds). In order to allow a user to recognize whether the touch input is a tap or a touch & hold, a feedback signal may be provided visually, audibly, or tactilely when the touch input is maintained for a threshold time or longer. The threshold time may be changed according to an example of implementation.

The term "double tap" refers to an operation in which a user touches a screen twice using a finger or a touch tool (a stylus).

The term "drag" refers to an operation in which a user touches a screen with a finger or a touch tool and then moves the finger or the touch tool to another location in the screen while maintaining the touch. With the drag operation, an object is moved or a panning operation to be described below is performed.

The term "panning" refers to a case in which a user performs a drag operation without selecting an object. Because panning does not select a specific object, an object does not move within a page, but the page itself moves within a screen, or a group of objects moves within a page.

The term "flick" refers to an operation in which a user drags at a threshold speed (e.g., 100 pixels/s) or more using a finger or a touch tool. Drag (or panning) is distinguished from a flick on the basis of whether the moving speed of the finger or the touch tool is greater than or equal to a threshold speed (e.g., 100 pixel/s).

The term "pinch" refers to an operation in which a user moves two fingers in different directions with the two fingers being touched on the screen. The term "pinch" is a gesture for enlargement (Pinch Open) or reduction (Pinch Close) of an object or page, and the value of enlargement or reduction is determined according to the distance between the two fingers.

The term "swipe" is an operation in which a user, while keeping a finger or touch tool touching an object on a screen, moves the finger or touch tool by a certain distance in a horizontal or vertical direction. Movement in a diagonal direction may not be recognized as a swipe event.

In this case, in response to occurrence of the preset event after the selecting of the character key according to the user selection while a user of the apparatus 100 for transmitting messages gazes at the display 140 (or while a gaze of the user is kept on the display 140), the controller 160 may be configured to perform a preset function corresponding to the event. The gaze (or gaze information) of the user may be tracked by analyzing image information including the user acquired through a camera (not shown) (or the sensor 130) provided in the apparatus 100 for transmitting messages.

In addition, in response to occurrence of the preset event after the selecting of the character key according to the user selection while a user of the apparatus 100 for transmitting messages does not gaze at the display 140 (or while a gaze of the user is not kept on the display 140), the controller 160 may be configured to not perform a preset function corresponding to the event to prevent malfunction.

As described above, when a character key is selected in the message input screen displayed on the apparatus for transmitting a message, and then another character key is indicated in a preset color around the selected character key for a preset time or longer, a preset message transmission function or a preset line break function may be performed.

In addition, as described above, when a character key is selected in the message input screen displayed on the apparatus for transmitting a message, and then a preset touch gesture of a user is detected on the transmission/reception message display region in the message input screen or a motion of the apparatus for transmitting a message is detected, a preset message transmission function or a preset line break function may be performed.

Hereinafter, a method of transmitting a message according to the present invention will be described in detail with reference to FIGS. 1 to 5.

Figure 2:
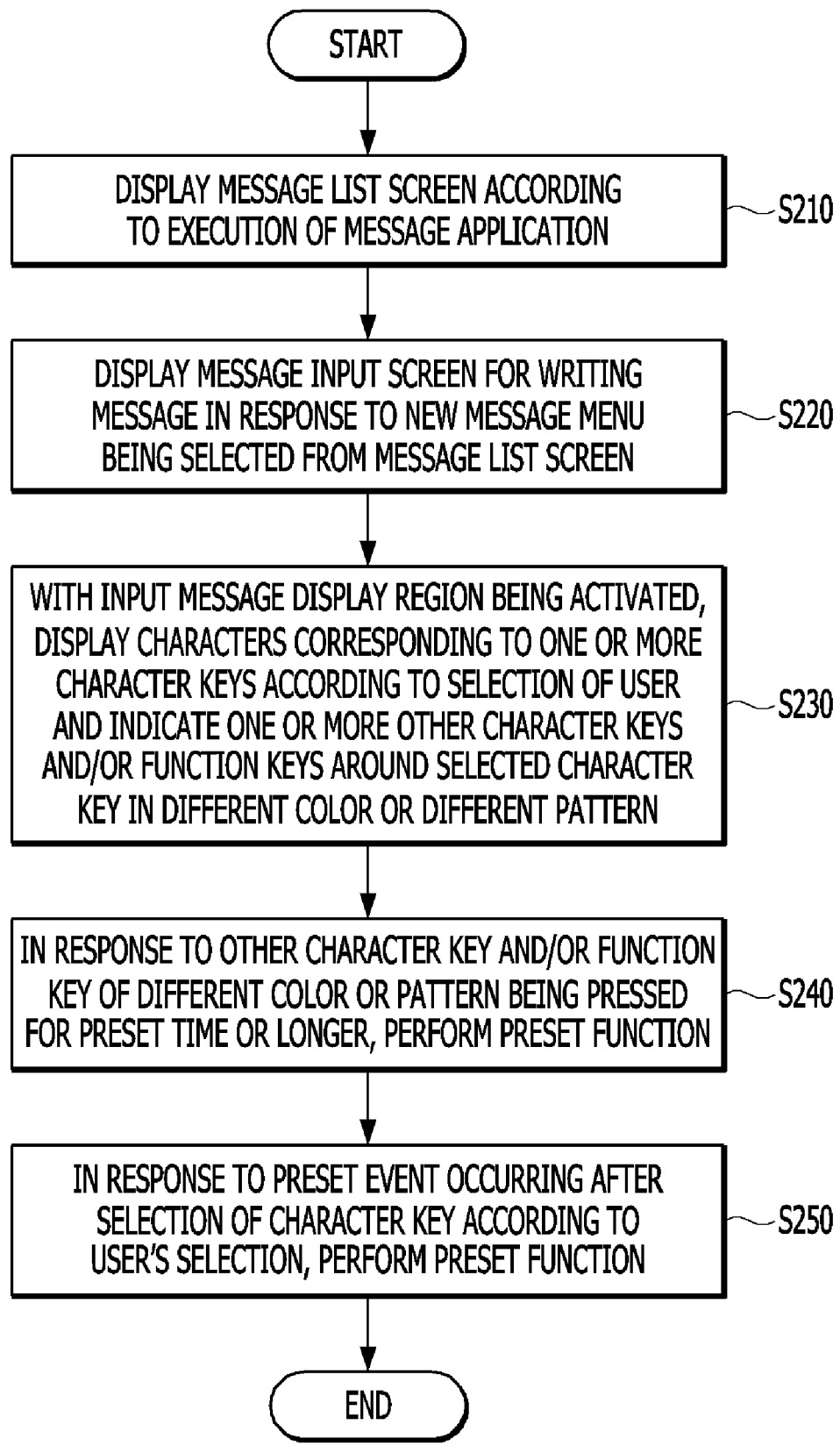
FIG. 2 is a flowchart showing a method of transmitting a message according to an embodiment of the present invention.

FIG. 2 is a flowchart showing a method of transmitting messages according to an embodiment of the present invention.

First, in response to a message application for message transmission being selected according to selection of a user (input/touch/control of a user) among a plurality of applications installed in the apparatus 100 for transmitting messages, the controller 160 executes the selected message application (or the selected message application program) and displays a message list screen according to execution of the message application on the 140. Here, the message list screen includes a search menu (or buttons/items) for searching for pre-stored message contents, a view-more menu for providing various functions related to messages, a full menu for displaying the contents of all messages transmitted/received, a new category menu for classifying transmitted/received messages according to various purposes (including business conversations, receipts, etc.), a new message menu for writing a new message content, and the like. In addition, the view-more menu includes a deletion item for deleting transmitted/received messages, a category editing item for editing information about categories, a group texting item for transmitting group texts to a plurality of terminals, an asterisk message item for adding an asterisk message to an important message, a setting item for setting various functions of the message application, and an inquiry item for delivering an inquiry to the text message transmission server (not shown) that provides the message application.

Figure 3:
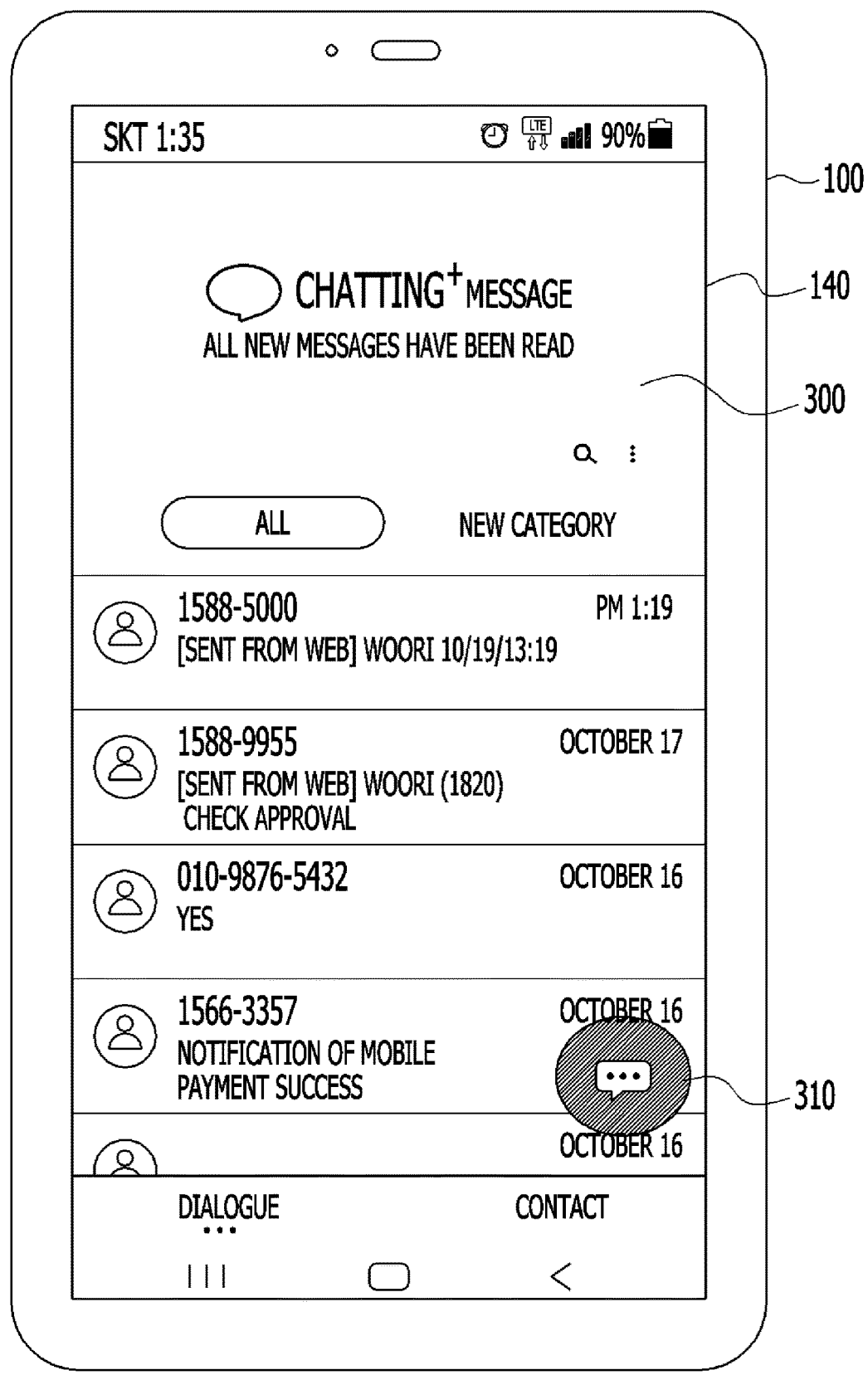
FIGS. 3 to 5 are views showing examples of screens of the apparatus for transmitting a message according to the embodiment of the present invention.

As an example, in response to the message application being selected from among a plurality of applications installed in a first apparatus 100 for transmitting a message according to selection of a user of the first apparatus 100 for transmitting a message, a first controller 160 executes the selected message application and displays a first message list screen 300 on a first display 140 as shown in FIG. 3 (S210).

Subsequently, in response to the new message menu being selected in the message list screen displayed on the display 140 according to selection (or input/touch/control of a user) of the apparatus 100 for transmitting messages, the controller 160 displays a message input screen for writing and transmitting a new message on the display 140. Here, the message input screen (or a message editing window) includes a recipient input region (or a menu/item) for inputting a phone number, an e-mail address, and the like related to a person (or a recipient) to receive a message, a transmission/reception message display region for displaying a content of a message exchanged (transmitted/received) with a specific recipient, a file attachment region for selecting a file previously stored in the apparatus 100 for transmitting messages and attaching the file to the message, a camera selection region for acquiring, in real time, image information of an image or a video using a camera provided in the apparatus 100 for transmitting messages, an additional menu display region for applying an additional function when transmitting the message, an input message display region for displaying a message content according to an input of the user, and a virtual keypad region including a plurality of virtual keys (or character keys/text keys). In addition, the additional menu display region includes a remittance item for remitting cash together with a message, a quick reply phrase item for selecting a preset reply phrase, a message reservation item for a reservation function for a message to be transmitted, a title item for setting a title of a message, an image transmission item for transmitting a pre-stored image together with a message, a video transmission item for transmitting a pre-stored video together with a message, an audio transmission item for transmitting a pre-stored audio together with a message, a contact transmission item for transmitting contacts stored in a phone book together with a message, a location transmission item for transmitting location information of the apparatus 100 for transmitting messages that is identified in real time together with a message, a calendar transmission item for transmitting pre-stored schedule information with a message, a memo transmission item for transmitting pre-stored contents of memo with a message, a voice recording item for transmitting voice information recorded in real time together with a message, and the like. In addition, the virtual keypad region includes various types of character keys (or character keys/virtual keys and function keys (for example, a delete key, a line break key/enter key, a Korean/English conversion key, a number/special character conversion key, etc.) for Korean input, English input, and other language input. Here, various types of characters corresponding to the various types of character keys include Korean consonants, Korean vowels, English uppercase letters, English lowercase letters, numbers, and special characters (e.g., a comma, a period, a question mark, an exclamation mark, a symbol, up/down/left/right arrow keys), and the like. In addition, a display method (or a notation method) of Korean consonants and Korean vowels may use a Cheon-ji-in method, a Narat-gul method, a QWERTY method, a short vowel method, a Vega method, etc. In addition, a display method (or a notation method) of uppercase and lowercase letters of English may use a QWERTY method, a 3×4 method (for example, letters of the alphabet arranged in rows of three or four letters, such as ABC, DEF, GHI, JKL, MNO, PQRS, TUV, WXYZ, etc. on one keyboard), and the like.

Figure 4:
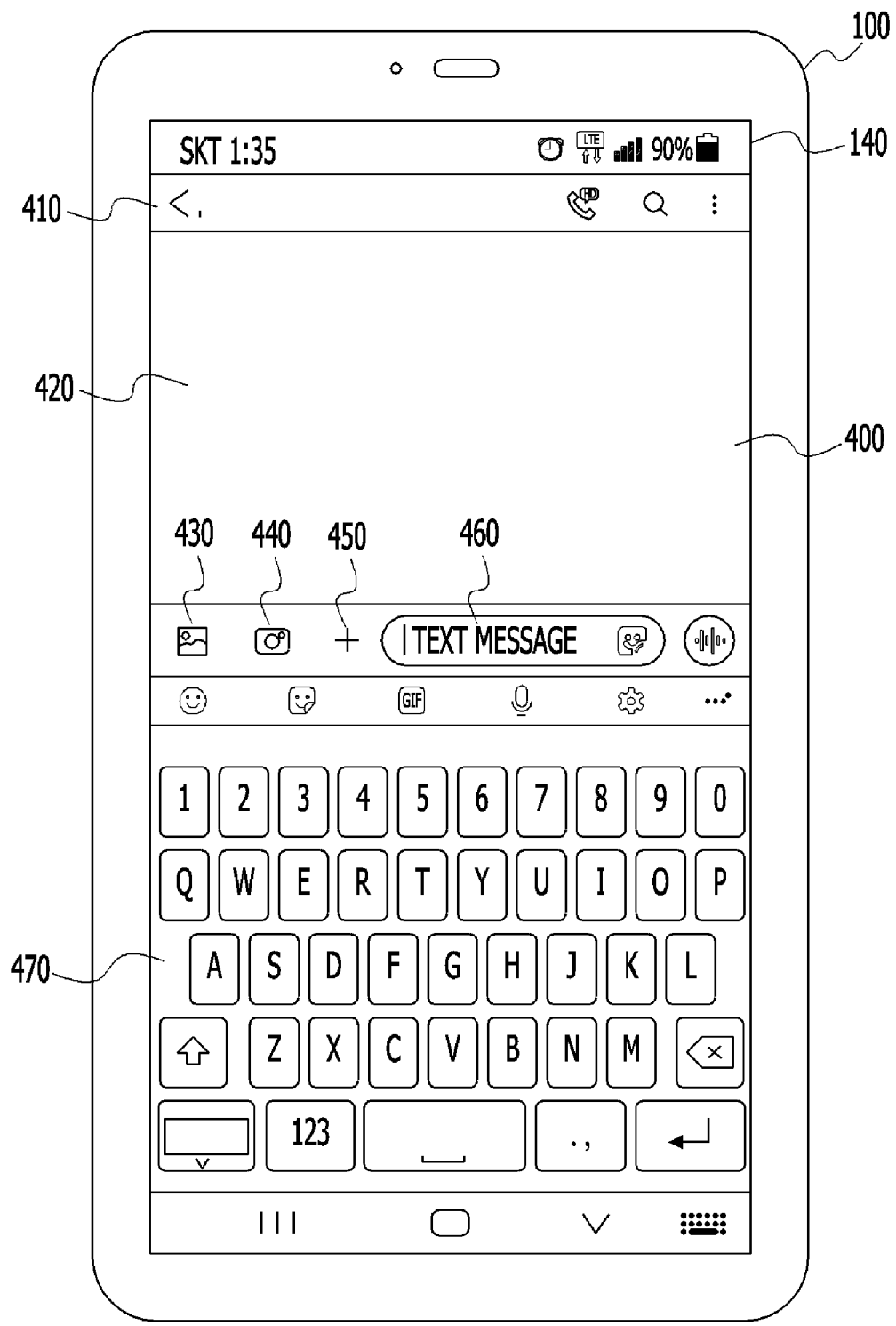
Figure 5:
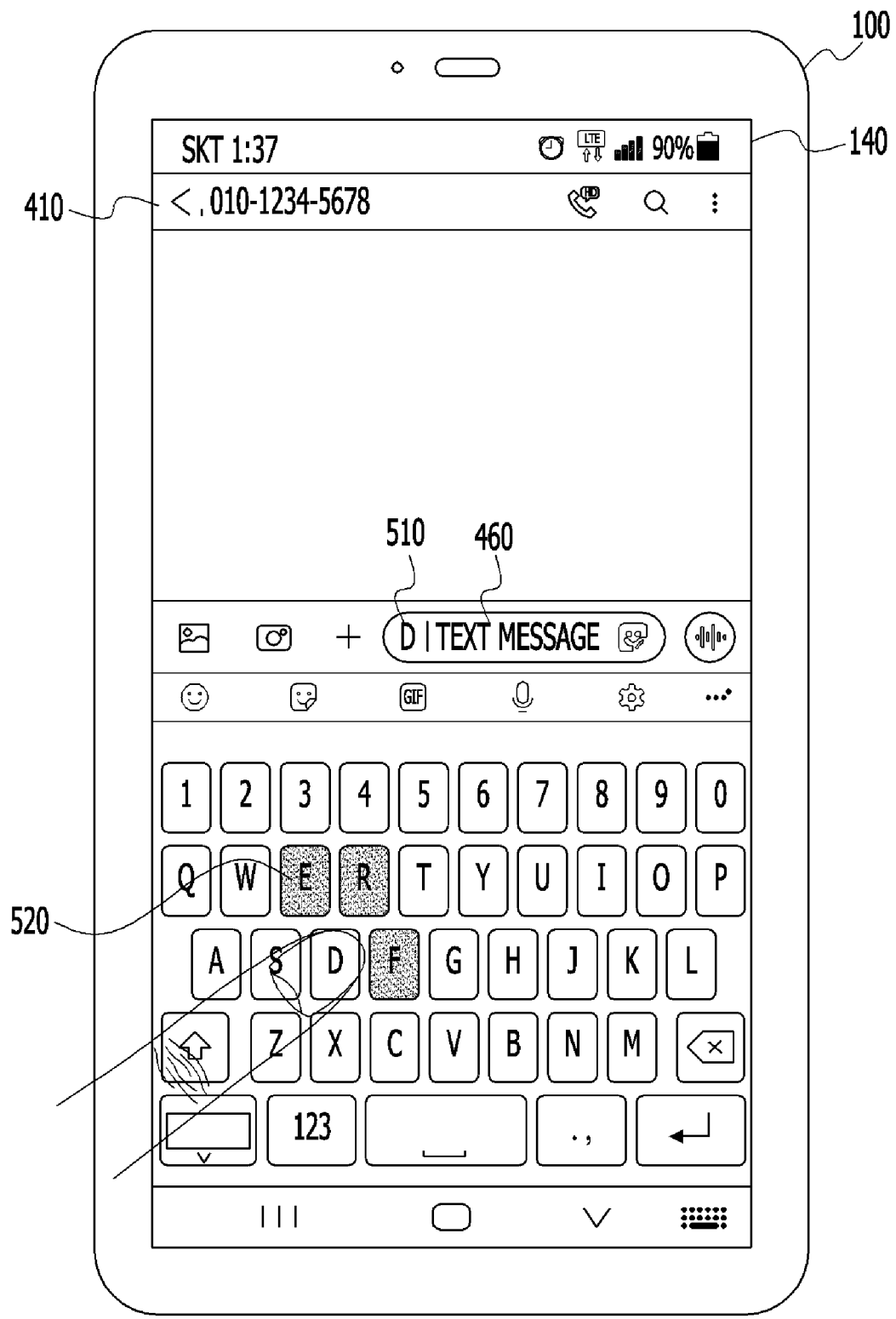

As an example, in response to a new message menu 310 being selected from the first message list screen 300 displayed on the first display 140, the first controller 160 displays a first message input screen 400 including a first recipient input region 410, a first transmission/reception message display region 420, a first file attachment region 430, a first camera selection region 330, a first additional menu display region 450, a first input message display region 460, and a first virtual keypad region 470 of QWERTY-type on the first display 140, as shown in FIG. 4 (S220).

In response to one or more character keys that are sequentially selected according to selection of a user among a plurality of character keys displayed on the virtual key pad region in the message input screen while the input message display region in the message input screen displayed on the display 140 is activated (or a cursor is located in the input message display region), the controller 160 sequentially displays the sequentially selected one or more character keys on the input message display region in the message input screen of the display. Here, the controller 160 may be in a state in which a phone number, an email address, etc. of a recipient who receives the message has been input (received) in the recipient input region according to an input of the user.

In this case, in response to one character key being selected among the plurality of character keys displayed on the virtual key pad region according to the selection of the user, the controller 160 indicates one or more other character keys and/or function keys located around (or adjacent to) the selected one character key in a preset different color (and/or different pattern).

In other words, in response to one character key among the plurality of character keys being selected according to a selection (a touch/input/control) of the user, the controller 160 may indicate one or more other character keys and/or function keys located around the selected one character key in a color (e.g., dark gray, light sky blue, light yellow, etc. and/or hatched pattern, horizontal line pattern, vertical line pattern, etc.) different from a preset background default color (e.g., light gray), or no pattern/background default patterns) that is set for the plurality of character keys displayed on the virtual key pad region.

For example, while a first phone number (e.g., 010-1234-5678) according to an input of a user is received by the first recipient input region 410 in a first message input screen 400 displayed on the first display 140, and a first input message display region 460 in the first message input screen 400 is activated, the first controller 160 is configured to, in response to a character key 'D' being selected according to selection of a user among a plurality of character keys included in a first virtual keypad region 470, display a character 'D' 510 corresponding to the selected character key 'D' in the first input message display region 460 of the first display 140, and indicate character keys 'E', 'R' and 'F' 520 located around the selected letter key 'D' to have a color different from colors of surrounding character keys (to be indicated in a color different from those of surrounding character keys) (S230).

After the character key is selected according to the user selection, the controller 160, in response to a specific other character key (or a specific other function key) among the one or more other character keys and function keys indicated in the preset different color around the character key that is being kept in a touch and hold state for a preset time or longer, performs a preset function. Here, the preset function includes a line break function, a text message transmission function, and the like. In this case, the line break function may be a function of changing the position of a cursor located next to a corresponding character key to the next line and displaying the position of the cursor. In addition, the text message transmission function is a function configured to, while recipient information of a recipient who receives a message is input on the recipient input region, transmit a message having been input in the input message display region until the specific other character key (or the specific other function key) is kept in the touch and hold state for the preset time or longer to a terminal (not shown) corresponding to the recipient information through connection between the text message transmission server and the apparatus 100 for transmitting messages. Here, in response to the recipient information not being received at a time when the specific other character key (or the specific other function key) is kept in the touch and hold state for the preset time or longer, the controller 160 may display guide information for inputting recipient information according to an input of the user on the display 140, and after receiving the recipient information according to the input of the user, may transmit the message to the terminal corresponding to the recipient information in connection with the text message transmission server.

As an example, in a state in which a message "David teacher, I'll meet you at the counseling office tomorrow at 3 pm" is input in the first input message display region 460 with the character key "m" selected last and the character keys "k" and "l" adjacent to the character key "m" and indicated in a different color (in the example, a color different from a color of surrounding character keys), when the character "1" is kept in a touch and hold state for a preset time (e.g., one second) or longer, the first controller 160 transmits the message "David teacher, I'll meet you at the counseling office tomorrow at 3 pm' displayed in the first input message display region 460 that has been input until the character "1" is kept in the touch and hold state for a predetermined time or longer to a terminal (not shown) corresponding to the first phone number (e.g., 010-1234-5678) received by the first recipient input region 410 through connection between the text message transmission server (S240).

In addition, in response to occurrence of a preset event after the character key is selected according to the user selection, the controller 160 performs the preset function. The preset function includes a line break function, a text message transmission function, and the like. In addition, the preset event includes a preset touch gesture of a user being detected in the transmission/reception message display region in the message input screen, a preset motion of the apparatus 100 for transmitting messages being detected through the sensor 130, a specific character key (or a specific function key) selected last that is kept in a touch and hold state for a preset time or longer, and a gaze of a user being kept on a specific region (e.g., the transmission/reception message display region, and the like) in the message input screen for another preset time (e.g., three seconds) or longer. In addition, the motion of the apparatus 100 for transmitting messages includes vibration/motion in the up/down direction a preset number of times or more, vibration/motion in the left/right direction a preset number of times or more, vibration/motion in a diagonal direction a preset number of times or more, rotation/motion in clockwise/counterclockwise directions a preset number of times or more, a change in the inclined angle of the apparatus 100 for transmitting messages at a preset angle or greater within a preset time, and the like.

As an example, in a state in which a message "David teacher, I'll meet you at the counseling office tomorrow at 3 pm" is input in the first input message display region 460, the first controller 160 is configured to, in response to occurrence of a flick in the first transmission/reception message display region 420 in the message input screen 400 according to an input of a user, transmit the message "David teacher, I'll meet you at the counseling office tomorrow at 3 pm" displayed on the first input message display region 460 that has been input until the flick occurs to a terminal (not shown) corresponding to the first phone number (for example, 010-1234-5678) received by the first recipient input region 410 through connection with the text message transmission server.

As another example, in a state in which a message "David teacher, I'll meet you at the counseling office tomorrow at 3 pm" is input in the first input message display region 460, the first controller 160 is configured to, in response to occurrence of a motion (or vibration) of the first apparatus 100 for transmitting a message in up/down directions by a preset number of times (for example, two times) or more, transmit the message "David teacher, I'll meet you at the counseling office tomorrow at 3 pm" displayed on the first input message display region 460 that has been input until the motion (or vibration) in up/down directions occurs to a terminal (not shown) corresponding to the first phone number (for example, 010-1234-5678) received by the first recipient input region 410 through connection with the text message transmission server (S250).

As described above, the embodiment of the present invention may perform a preset message transmission function or a preset line break function by selecting a character key on a message input screen displayed on the apparatus and then pressing another character key displayed in a preset color around the selected character key for a preset time or longer so that the efficiency of keyboard input may be enhanced and the convenience of user inputting text may be improved.

In addition, as described above, the embodiment of the present invention may perform a preset message transmission function or a preset line break function by selecting a character key in a message input screen displayed on the apparatus for transmitting a message and then detecting a preset touch gesture of a user on a transmission/reception message display region in the message input screen or detecting a preset motion of the apparatus for transmitting a message, thereby removing inconvenience of moving a long distance after entering a last character in order to press a transmission button or an enter button located at a fixed region.

As is apparent from the above, the apparatus for transmitting a message and the method thereof perform a preset message transmission function or a preset line break function by selecting a character key on a message input screen displayed on the apparatus for transmitting a message and then pressing another character key displayed in a preset color around the selected character key for a preset time or longer so that the efficiency of keyboard input can be enhanced and the convenience of user inputting text can be improved.

In addition, the apparatus for transmitting a message and the method thereof perform a preset message transmission function or a preset line break function by selecting a character key in a message input screen displayed on the apparatus for transmitting a message and then detecting a preset touch gesture of a user on a transmission/reception message display region in the message input screen or detecting a preset motion of the apparatus for transmitting a message, thereby removing an inconvenience of moving a long distance after entering a last character in order to press a transmission button or an enter button located at a fixed region.

It will be understood by those skilled in the art that various changes in form and details may be made therein without departing from the spirit and scope of the invention as defined by the appended claims. Therefore, the embodiments disclosed in the present invention are intended to illustrate rather than limit the scope of the present invention, and the scope of the technical idea of the present invention is not limited by these embodiments. The scope of protection of the present invention should be construed according to the following claims, and all technical ideas within the scope of equivalents should be construed as being included in the scope of the present invention.

What is claimed is:

1. An apparatus for transmitting a message, comprising:
a display configured to display a message list screen; and
a controller configured to:
when a preset new message menu is selected in the message list screen displayed on the display, control the display to display a message input screen corresponding to the selected new message menu;
when one or more character keys are sequentially selected according to selection of a user among a plurality of character keys displayed on a virtual key pad region in the message input screen while an input message display region in the message input screen displayed on the display is activated, sequentially display the sequentially selected one or more character keys on the input message display region in the message input screen of the display;

when the one character key is selected according to the selection of the user among the plurality of character keys displayed on the virtual key pad region, indicate one or more other character keys or function keys adjacent to the selected one character key in a preset different color or pattern; and after the character key is selected according to the selection of the user, when a specific other character key or a specific other function key among the one or more other character keys and function keys indicated in the preset different color adjacent to the one character key is kept in a touch and hold state for a preset time or longer, perform a preset function.

2. The apparatus of claim 1, wherein the message input screen includes at least one of:

a recipient input region for receiving a phone number or an e-mail address related to a specific recipient who receives a message;

a transmission/reception message display region for displaying a content of a message exchanged with the specific recipient;

a file attachment region for selecting a file previously stored in the apparatus including the display and attaching the file to the message;

a camera selection region for acquiring, in real time, image information of an image or a video using a camera provided in the apparatus;

an additional menu display region for applying an additional function when transmitting the message;

the input message display region for displaying a message content according to an input of the user; and a virtual keypad region including a plurality of virtual keys.

3. The apparatus of claim 1, wherein the preset function includes any one of a line break function and a text message transmission function.

4. The apparatus of claim 1, wherein the text message transmission function is a function configured to, while recipient information of a recipient who receives a message is input on a recipient input region in the message input screen, transmit a message that is input in the input message display region until the specific other character key or the specific other function key is kept in the touch and hold state for the preset time or longer to a terminal corresponding to the recipient information in connection with a text message transmission server.

5. An apparatus for transmitting a message, comprising:

a display configured to, when a preset new message menu is selected in a message list screen, display a message input screen corresponding to the selected new message menu; and a controller configured to, when one or more character keys are sequentially selected according to selection of a user among a plurality of character keys displayed on a virtual key pad region in the message input screen while an input message display region in the message input screen displayed on the display is activated, sequentially display the sequentially selected one or more character keys on the input message display region in the message input screen of the display, and when a preset event occurs after the selecting of the character key according to the selection of the user, perform a preset function.

6. A method of transmitting a message, comprising:

displaying, by a display, a message list screen;

when a preset new message menu is selected in the message list screen displayed on the display, displaying, by a controller, a message input screen corresponding to the selected new message menu;

when one or more character keys are sequentially selected according to selection of a user among a plurality of character keys displayed on a virtual key pad region in the message input screen while an input message display region in the message input screen displayed on the display is activated, sequentially displaying, by the controller, the sequentially selected one or more character keys on the input message display region in the message input screen;

when the one character key is selected according to the selection of the user among the plurality of character keys displayed on the virtual key pad region, indicating, by the controller, one or more other character keys or function keys adjacent to the selected one character key in a preset different color or pattern; and after the character key is selected according to the selection of the user, when a specific other character key or a specific other function key among the one or more other character keys and function keys indicated in the preset different color adjacent to the one character key is being kept in a touch and hold state for a preset time or longer, performing, by the controller, a preset function.

7. The method of claim 6, wherein the indicating of the one or more other character keys or function keys adjacent to the selected one character key in the preset different color or pattern includes, when a character key is selected according to the selection of the user among the plurality of character keys, indicating at least one of one or more other character keys and function keys around the selected character key in a color or pattern different from a preset background default color or background default pattern set for the plurality of character keys displayed on the virtual key pad region.

8. The method of claim 6, further comprising, after the character key is selected according to the selection of the user, when a specific other character key or a specific other function key among the one or more other character keys and function keys indicated in the preset different color around the character key is kept in touch for less than the preset time, performing, by the controller, a function corresponding to the specific other character key or the specific other function key that is touched.

9. A method of transmitting a message, comprising:

when a preset new message menu is selected in a message list screen displayed on a display, displaying, by a controller, a message input screen corresponding to the selected new message menu;

when one or more character keys are sequentially selected according to selection of a user among a plurality of character keys displayed on a virtual key pad region in the message input screen while an input message display region in the message input screen displayed on the display is activated, sequentially displaying, by the controller, the sequentially selected one or more character keys on the input message display region in the message input screen; and when a preset event occurs after the selecting of the character key according to the user selection, performing, by the controller, a preset function.

10. The method of claim 9, wherein the preset event includes at least one of:
- a preset touch gesture of the user being detected in a transmission/reception message display region in the message input screen;
- a preset motion of an apparatus for transmitting a message being detected through a sensor;
- a specific character key or a specific function key selected last that is kept in a touch and hold state for a preset time or longer; and
- a gaze of the user being kept on a specific region in the message input screen for another preset time or longer.

* * * * *